(12) United States Patent
Parrinello et al.

(10) Patent No.: US 12,179,409 B2
(45) Date of Patent: Dec. 31, 2024

(54) APPARATUS FOR BLOW-MOLDING PLASTIC CONTAINERS

(71) Applicant: SACMI IMOLA S.C., Imola (IT)

(72) Inventors: Fiorenzo Parrinello, Medicina (IT); Alessandro Rosso, Pieve di Soligo (IT); Andrea Carpana, Frazione Roccalanzona (IT)

(73) Assignee: SACMI IMOLA S.C., Imola (IT)

( * ) Notice: Subject to any disclaimer, the term of this patent is extended or adjusted under 35 U.S.C. 154(b) by 228 days.

(21) Appl. No.: 17/289,941

(22) PCT Filed: Oct. 30, 2019

(86) PCT No.: PCT/IB2019/059289
§ 371 (c)(1),
(2) Date: Apr. 29, 2021

(87) PCT Pub. No.: WO2020/089801
PCT Pub. Date: May 7, 2020

(65) Prior Publication Data
US 2022/0009147 A1 Jan. 13, 2022

(30) Foreign Application Priority Data
Oct. 30, 2018 (IT) .................. 102018000009880

(51) Int. Cl.
*B29C 49/54* (2006.01)
*B29C 49/48* (2006.01)
(Continued)

(52) U.S. Cl.
CPC ........ *B29C 49/541* (2013.01); *B29C 49/4823* (2013.01); *B29C 49/62* (2013.01);
(Continued)

(58) Field of Classification Search
CPC ... B29C 49/541; B29C 49/4823; B29C 49/62; B29C 2049/4825; B29C 2049/4892; B29C 2049/7831; B29L 2031/7158
See application file for complete search history.

(56) References Cited

U.S. PATENT DOCUMENTS

| 7,563,090 B2 | 7/2009 | Dannebey et al. |
| 10,471,645 B2 | 11/2019 | Parrinello et al. |

(Continued)

FOREIGN PATENT DOCUMENTS

| EP | 1976679 A1 | 10/2008 |
| EP | 3348374 A1 | 7/2018 |

(Continued)

OTHER PUBLICATIONS

International Search Report issued Jan. 2, 2020 re: Application No. PCT/IB2019/059289, pp. 1-4.

(Continued)

*Primary Examiner* — S. Behrooz Ghorishi
(74) *Attorney, Agent, or Firm* — CANTOR COLBURN LLP

(57) ABSTRACT

An apparatus for blow-molding plastic containers includes at least one blow-molding station which defines at least one molding cavity which extends around a main axis of extension and further includes at least two lateral bodies and a respective bottom for each molding cavity that is defined by the blow-molding station. The bottom defines a recessed central portion, which is arranged around the main axis of extension, and a lateral containment portion, which has petal-shaped regions which have a substantially radial extension.

13 Claims, 3 Drawing Sheets

(51) Int. Cl.
B29C 49/62 (2006.01)
B29L 31/00 (2006.01)

(52) U.S. Cl.
CPC ............. *B29C 2049/4825* (2013.01); *B29C 2049/4892* (2013.01); *B29L 2031/7158* (2013.01)

(56) References Cited

U.S. PATENT DOCUMENTS

| | | | |
|---|---|---|---|
| 2005/0206046 A1 | 9/2005 | Newman et al. | |
| 2011/0018177 A1 | 1/2011 | Goss et al. | |
| 2011/0165285 A1* | 7/2011 | Lane | B29C 49/4823 425/526 |
| 2017/0072616 A1* | 3/2017 | Goss | B29C 49/4802 |
| 2017/0072617 A1* | 3/2017 | Maki | B29C 49/28 |

FOREIGN PATENT DOCUMENTS

| | | |
|---|---|---|
| JP | 104276424 A | 10/1992 |
| JP | 2000167916 A | 6/2000 |
| JP | 2007290772 A | 11/2007 |
| WO | 2017144615 A1 | 8/2017 |

OTHER PUBLICATIONS

IT Search Report issued Oct. 8, 2019 re: Application No. IT 201800009880, pp. 1-8.
Written Opinion issued Jan. 2, 2020 re: Application No. PCT/IB2019/059289, pp. 1-7.
Chinese Office Action for Chinese Application No. 2019800722598, dated Jul. 5, 2023, 15 pages.
Translated JP Office Action for Japanese Patent Application No. 2021-523459, dated Jun. 1, 2023, 32 pages.
Indian Office Action for Indian Application No. 202137017235, dated Dec. 8, 2023, 3 pages.

* cited by examiner

APPARATUS FOR BLOW-MOLDING PLASTIC CONTAINERS

TECHNICAL FIELD

The present disclosure relates to an apparatus for blow-molding plastic containers.

BACKGROUND

Typically, such apparatuses for blow-molding plastic containers comprise blow-molding stations that define one or more molding cavities for forming the containers.

In particular, the blow-molding stations comprise two lateral bodies, and a respective bottom for each forming cavity defined by the blow-molding station.

At least one of the lateral bodies is movable on command by way of cyclic opening and closing means, as is the bottom, so as to allow the transition of the molding station from an open condition, in which the is preform or preforms can be fed in and the blow-molded container can be ejected, and a closed condition, in which the blow-molding of the preform is performed in order to obtain the container.

During blow-molding operations, it is necessary to evacuate the air from the mold, as this air hampers the correct forming of the container.

Such evacuation is usually achieved by providing air evacuation ducts that connect the inside of the mold with the outside.

In many cases, apparatuses for blow-molding containers operate under highly variable working conditions that depend on many factors such as, for example, the pressure of blow-molding, the weight of the preforms, the material of the preforms, and the temperature of the preforms.

With the varying of the above mentioned working conditions, in many cases the result is a certain variability of the molded containers which sometimes are non-compliant or in any case at the limit of the tolerances required.

In particular, in some cases, problems are encountered which are linked to the eversion of the bottom, which are accentuated if it is desired to perform blow-molding at pressures that are not excessively high (for example equal to about 20 bar).

SUMMARY

The aim of the present disclosure is to provide an apparatus for blow-molding plastic containers which is capable of improving the known art in one or more of the above mentioned aspects.

Within this aim, the disclosure provides an apparatus for blow-molding plastic containers that makes it possible to obtain containers that meet the required requirements even with the variation of the active working conditions and of the characteristics of the preforms used.

The disclosure also provides an apparatus for blow-molding plastic containers that is highly reliable, easy to implement and of low cost.

This aim and these and other advantages which will become better apparent hereinafter are achieved by providing an apparatus for blow-molding plastic containers according to claim 1, optionally provided with one or more of the characteristics of the dependent claims.

BRIEF DESCRIPTION OF THE DRAWINGS

Further characteristics and advantages of the disclosure will become better apparent from the detailed description that follows of a preferred, but not exclusive, embodiment of the apparatus for blow-molding plastic containers according to the disclosure, which is illustrated for the purposes of non-limiting example in the accompanying drawings wherein.

DETAILED DESCRIPTION OF THE DRAWINGS

Figure 1:
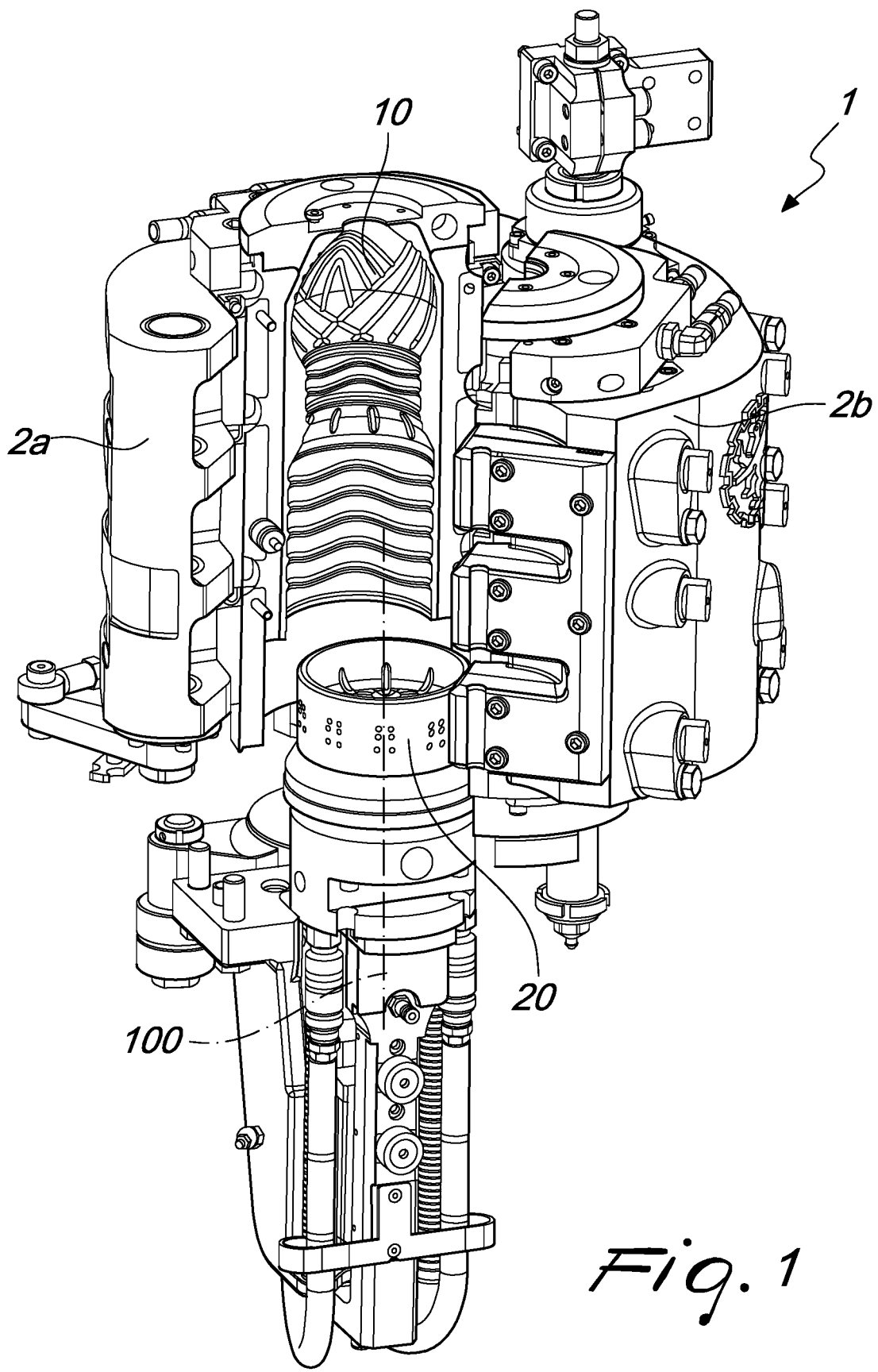
FIG. 1 is an overall perspective view of a blow-molding station of an apparatus for blow-molding plastic containers according to the disclosure.
Figure 2:
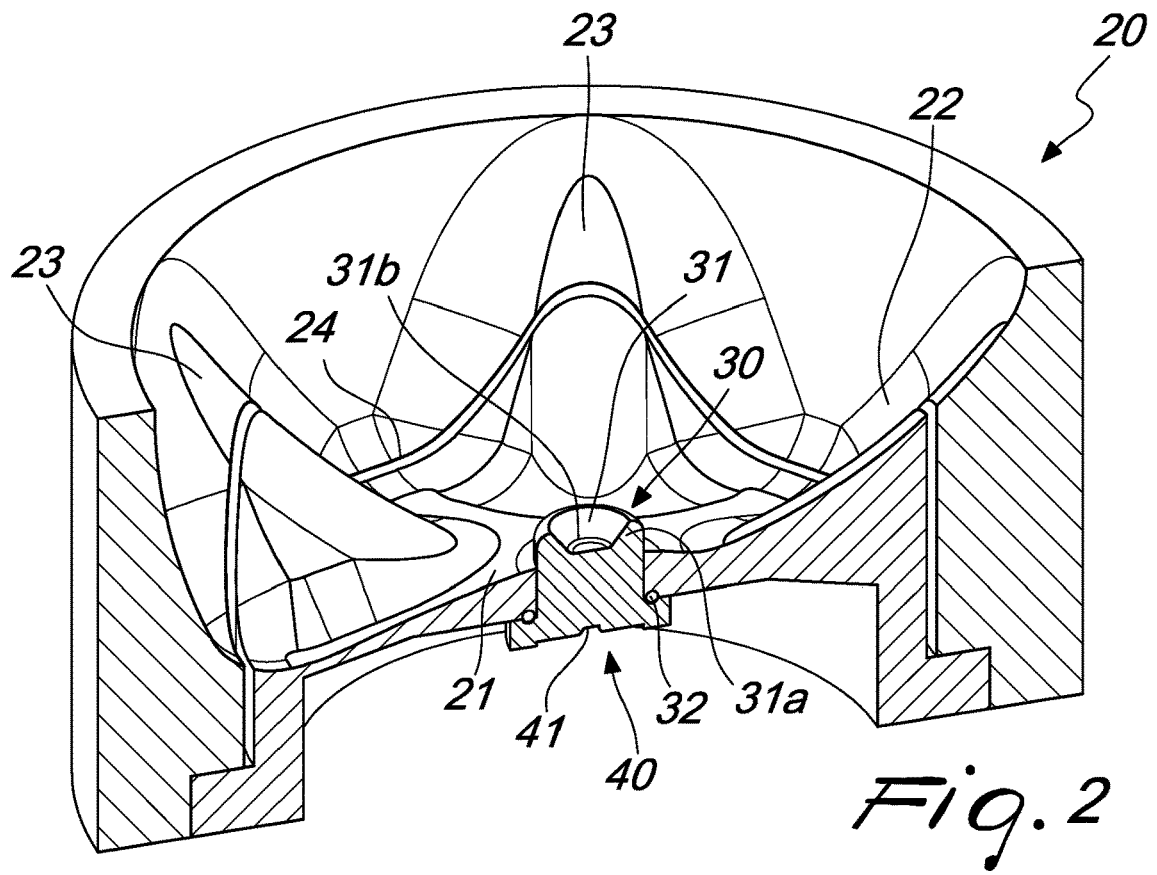
FIG. 2 is a cross-sectional perspective view taken along a diametrical plane, with the central abutment body in a first position.
Figure 3:
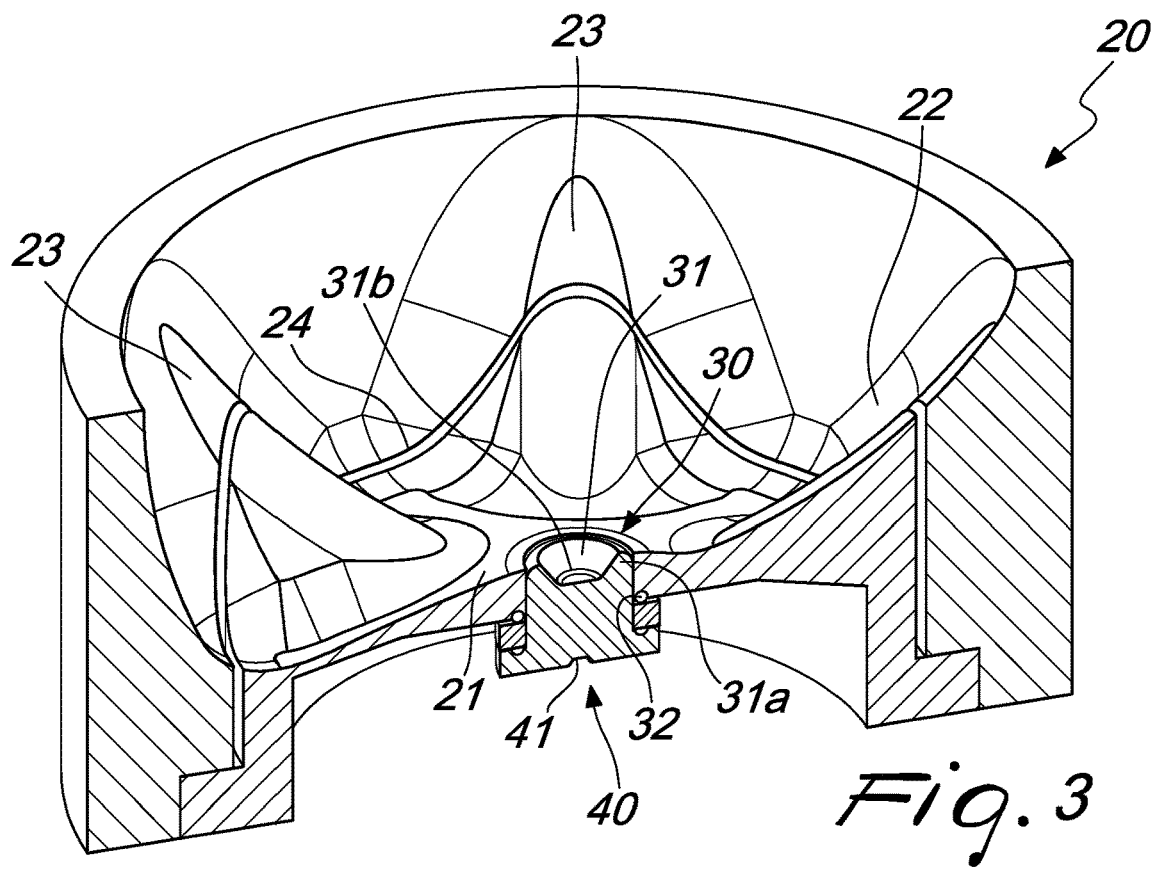
FIG. 3 is a cross-sectional perspective view taken along a diametrical plane, with the central abutment body in a second position.
Figure 4:
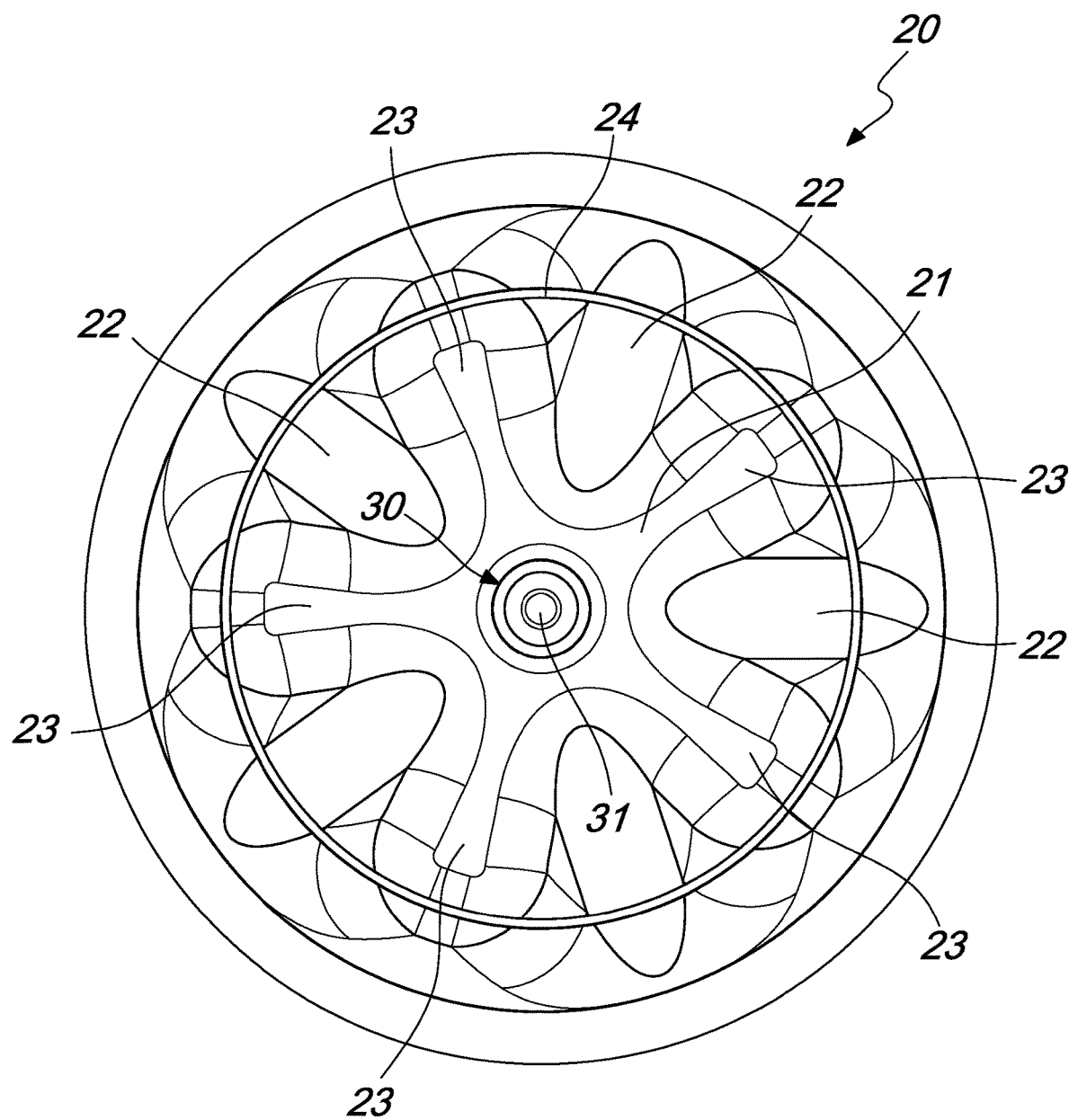
FIG. 4 is a view of the bottom from above.

With reference to the figures, the apparatus for blow-molding plastic containers according to the disclosure comprises at least one blow-molding station, generally designated by the reference numeral 1, which defines at least one molding cavity 10 which extends about a respective main axis of extension 100.

Typically, the blow-molding stations 10 are supported at the peripheral region of a carousel, which is able to rotate about a rotation axis of the carousel, and the longitudinal main axes 100 of the blow-molding stations 1 are arranged substantially parallel to the rotation axis of the carousel.

The or each molding station 1 comprises at least two lateral bodies 2a, 2b, and a respective bottom 20 for each forming cavity 10 that is defined by the blow-molding station 1.

In particular, at least one of the lateral bodies 2a, 2b and the bottom 20 are movable on command by way of cyclic opening and closing means in order to allow the transition of the molding station 1 from an open condition, in which the preform or preforms can be fed in and the blow-molded container can be ejected, and a closed condition, in which the blow-molding is performed of the preform in order to obtain the container.

The bottom 20 defines a recessed central portion 21, which is arranged around the main axis of extension 100, and a lateral containment portion 22.

Advantageously, the lateral containment portion 22 comprises a plurality of petal-shaped regions 23 which have a substantially radial extension.

According to the present disclosure, the bottom 20 comprises a central abutment body 30 which defines a head portion 31 which is arranged inside the cavity 10.

The central abutment body 30 is, in particular, adjustable in position, via adjustment means 40, along an adjustment direction that is substantially parallel to the main axis of extension 100 in order to vary the distance between the abutment head 31 and the respective recessed central portion 21 of the bottom 20.

In practice, by acting on the adjustment means 40, it is possible to vary the base clearance BDBC.

Conveniently, the abutment head 31 comprises a lateral containment body 31a, inside which there is a seat 31b which has a concavity which is directed toward the cavity 10.

Conveniently, the adjustment axis corresponds substantially to the main axis of extension 100.

According to a preferred embodiment, the bottom 20 comprises a circumferential venting groove 24 which is defined in the above mentioned bottom 20 at the lateral containment portion 22 and extends around the main axis of extension 100.

Naturally there is no reason not to use classic bottoms, including bottoms made in a single piece, and bottoms adapted for molding at higher pressures.

Conveniently, the adjustment means 40 are provided with an adjustment portion 41 which is associated with the bottom 20 and is arranged at the external surface of the bottom 20 that is arranged on the opposite side with respect to the cavity 10.

Advantageously, sealing means 32 are arranged between the external surface of the bottom 20 and the central abutment body 30.

Preferably, the central abutment body 30 has an elongated body which defines, at a first longitudinal end, the abutment head 31 and, at the second longitudinal end, which is opposite to the first one, the adjustment portion 41.

The adjustment means 41 comprise, for example, a screw-and-nut coupling between the central abutment body 30 and the bottom 20.

The bottom therefore defines, substantially at the adjustment axis, a threaded hole which can engage with a male threading defined on the lateral surface of the elongated body.

At the second longitudinal end, the elongated body has a maneuvering portion on which the user can intervene in order to displace, along the adjustment axis, the elongated body so as to be able to vary the distance between the abutment head 31 and the respective recessed central portion 21 of the bottom 20.

The bottom 20 is functionally associated with a cooling circuit.

Advantageously, the blow-molding station is adapted to perform the blow-molding of the containers at a pressure of less than 25 bar, and more preferably at 20 bar.

Conveniently, the blow-molding station is adapted to perform the blow-molding of the containers at a pressure of less than 15 bar.

Use of the apparatus according to the disclosure is the following.

Before beginning operations to mold via blow molding, the central abutment body 30 is positioned so that the abutment head 31 is positioned so as to define a base clearance BC that is deemed ideal for the operating characteristics for the process and for the product.

If analysis of the containers produced by the blow-molding station is exhibit problems or defects (for example incorrect manufacture of the bottom of the container, or problems of eversion), it is possible to intervene, via the adjustment means, on the position of the abutment head 31 so as to increase and/or reduce the base clearance BC until containers are obtained that are capable of meeting the specific requirements.

In this manner it is possible to furthermore appreciably reduce the average pressure of blow-molding, so as to reduce the production costs.

In practice it has been found that the disclosure fully achieves the intended aim and advantages by providing an apparatus that is capable of rendering the process of molding containers extremely practical, even with the variation of the process parameters.

The disclosure, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102018000009880 from which this application claims priority are incorporated herein by reference.

The invention claimed is:

1. An apparatus for blow-molding plastic containers, the apparatus comprises: at least one blow-molding station which defines at least one molding cavity which extends around a main axis of extension, said blow-molding station comprising at least two lateral bodies and a bottom for the at least one molding cavity that is defined by said blow-molding station, at least one of said at least two lateral bodies and said bottom being configured to move on command to allow a transition of said molding station from an open condition, wherein a feeding of a preform or of preforms and an unloading of a blow-molded container are possible, and a closed condition, wherein the blow-molding of the preform is performed in order to obtain said blow-molded container, said bottom defining a recessed central portion, which is arranged around said main axis of extension, and a lateral containment portion, wherein said recessed central portion comprises an aperture and wherein said bottom comprises a central abutment body which defines a head portion which is arranged inside said molding cavity, said central abutment body being adjustable in position through said aperture relative to the recessed central portion, by an adjustment component, along an adjustment direction that is substantially parallel to said main axis of extension in order to vary a distance between said head portion of the central abutment body and the recessed central portion of said bottom, wherein said recessed central portion disposed around the aperture is flat and wherein said head portion of the central abutment body comprises a seat having a concavity directed toward said molding cavity, the seat being disposed below the recessed central portion at at least one position of the central abutment body.

2. The apparatus according to claim 1, wherein said head of the central abutment body comprises a lateral containment body, the seat being positioned in the lateral containment body.

3. The apparatus according to claim 1, wherein said adjustment direction substantially corresponds to said main axis of extension.

4. The apparatus according to claim 1, wherein said lateral containment portion of said bottom comprises a plurality of petal-shaped regions which have a substantially radial extension.

5. The apparatus according to claim 1, wherein said bottom comprises a circumferential venting groove defined in said bottom at said lateral containment portion and extends around said main axis of extension.

6. The apparatus according to claim 1, wherein said adjustment component is provided with an adjustment portion associated with said bottom and arranged at an external surface of said bottom that is arranged on an opposite side with respect to said molding cavity.

7. The apparatus according to claim 6, further comprising a sealing component arranged between said external surface of said bottom and said central abutment body.

8. The apparatus according to claim 6, wherein said central abutment body has an elongated body which defines, at a first longitudinal end, said head portion and, at an opposite longitudinal end, said adjustment portion.

9. The apparatus according to claim 6, wherein said adjustment component comprises a screw-and-nut coupling between said central abutment body and said bottom.

10. The apparatus according to claim 1, wherein said bottom is functionally associated with a cooling circuit.

11. The apparatus according to claim 1, wherein said blow-molding station is configured to perform the blow-molding of said plastic containers at a pressure of less than 25 bar.

12. The apparatus according to claim 1, wherein an opening is disposed below the edge of the lateral containment portion.

13. The apparatus according to claim 1, wherein the central abutment body is located at the lowest point of the bottom of the at least one molding cavity.

* * * * *